(12) United States Patent
Sevindik

(10) Patent No.: US 11,617,182 B2
(45) Date of Patent: Mar. 28, 2023

(54) BEAM-LEVEL SPECTRUM MANAGEMENT IN 5G RADIO NETWORKS

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 27 days.

(21) Appl. No.: 16/952,836

(22) Filed: Nov. 19, 2020

(65) Prior Publication Data

US 2022/0159661 A1    May 19, 2022

(51) Int. Cl.
*H04B 17/336* (2015.01)
*H04W 16/28* (2009.01)
*H04W 72/04* (2009.01)
*H04W 72/08* (2009.01)
*H04W 72/044* (2023.01)

(52) U.S. Cl.
CPC ....... *H04W 72/082* (2013.01); *H04W 72/046* (2013.01)

(58) Field of Classification Search
None
See application file for complete search history.

(56) References Cited

U.S. PATENT DOCUMENTS

| | | | |
|---|---|---|---|
| 10,477,491 B2 | 11/2019 | Mueck et al. | |
| 2016/0112970 A1* | 4/2016 | Chen | H04W 52/42 455/522 |
| 2018/0070380 A1* | 3/2018 | Nagaraja | H04B 7/00 |
| 2018/0098289 A1* | 4/2018 | Visotsky | H04W 16/28 |
| 2018/0205437 A1* | 7/2018 | Kim | H04B 7/0639 |
| 2018/0278298 A1* | 9/2018 | Takano | H04B 7/063 |
| 2018/0287722 A1* | 10/2018 | Takano | H04L 5/0048 |
| 2019/0174554 A1 | 6/2019 | Deenoo et al. | |
| 2019/0306850 A1 | 10/2019 | Zhang et al. | |
| 2020/0008081 A1 | 1/2020 | Ashrafi | |
| 2020/0068548 A1 | 2/2020 | Guan et al. | |
| 2020/0084780 A1 | 3/2020 | Wiatrowski et al. | |
| 2021/0014693 A1* | 1/2021 | Syed | H04W 16/14 |
| 2021/0029549 A1 | 1/2021 | Notarigiacomo et al. | |
| 2021/0227396 A1* | 7/2021 | Khalid | H04W 16/28 |
| 2021/0266209 A1* | 8/2021 | Zach | H04W 88/14 |
| 2021/0337391 A1* | 10/2021 | Sevindik | H04W 8/26 |
| 2022/0007200 A1* | 1/2022 | Sevindik | H04W 16/10 |
| 2022/0007374 A1* | 1/2022 | Sevindik | H04B 17/318 |
| 2022/0386131 A1 | 12/2022 | Guo et al. | |

OTHER PUBLICATIONS

Non-Final Office Action for U.S. Appl. No. 17/329,427; dated Dec. 8, 2022 (10 pages).

* cited by examiner

*Primary Examiner* — Sai Aung
(74) *Attorney, Agent, or Firm* — Mendelsohn Dunleavy, P.C.; Steve Mendelsohn

(57) ABSTRACT

In a (e.g., 5G CBRS) radio system, a processor (e.g., a SAS) receives, from (e.g., CBSD) base stations, beam-level information about beams used by the base stations to communicate with UEs, uses the information to assess interference associated with the beams, and instructs the base stations to modify one or more specified beams in order to reduce the interference. In addition to powering down one or more specified beams, a base station may create new beams to attempt to satisfy UE bandwidth needs without creating unacceptable levels of interference.

6 Claims, 3 Drawing Sheets

BEAM-LEVEL SPECTRUM MANAGEMENT IN 5G RADIO NETWORKS

BACKGROUND

Field of the Disclosure

The present disclosure relates to telecommunications and, more specifically but not exclusively, to spectrum management in radio networks such as 5G radio networks.

Description of the Related Art

This section introduces aspects that may help facilitate a better understanding of the disclosure. Accordingly, the statements of this section are to be read in this light and are not to be understood as admissions about what is prior art or what is not prior art.

In conventional 5G radio networks, a Spectrum Access System (SAS) is responsible for controlling the allocation to base stations of bandwidth within the 150-MHz Citizens Broadband Radio Service (CBRS) spectrum of the 3.5-GHz 5G frequency band. In particular, a SAS is responsible for allocating some or all of the CBRS spectrum to individual CBRS base stations (CBSDs) within the SAS's coverage region, with each CBSD in turn allocating some or all of its allocated bandwidth to the individual user equipments (UEs) within its local coverage area.

In order to avoid or at least limit the interference between the CBSDs and UEs associated with different SASs, the SASs performs a nightly Coordinated Periodic Activity among SASs (CPAS) operation in which the SASs determine which CBSDs need to be powered off or at least have their bandwidth allocations reduced. Each SAS will then modify the bandwidth allocated to any such CBSDs within its coverage region in order to avoid or at least limit the interference associated with those CBSDs. In addition to this CPAS operation coordinated among multiple SASs, each SAS may also individually perform similar interference analysis to detect and limit interference between its own CBSDs and UEs by adjusting the bandwidth allocated to any offending CBSDs, including possibly powering down an entire network cluster of CBSDs. As used herein, the phrase "powering down a CBSD" refers to decreasing the total power level at which a CBSD is allowed transmit downlink signals, including reducing that power level to zero.

SASs perform these tasks to protect Priority Access License (PAL) holders and incumbent (i.e., military) users from interference. For 5G telecommunications, the FCC borrowed the 3.5-GHz frequency band from the military, which uses that band for radar communication purposes, with a strong promise from the FCC of keeping the band interference-free to military users.

SUMMARY

In 5G radio networks, base stations, such as CBSDs, communicate with UEs using UE-specific beams, where each UE receives downlink (DL) signals from a base station via one or more DL beams that are dedicated to only that UE, where different DL beams may have different bandwidths with higher bandwidth typically associated with higher transmission power. In the uplink (UL) direction, each UE transmits UL signals to the base station using a single UL beam. Here, too, different UL beams may have different bandwidths, again with higher bandwidth typically associated with higher transmission power.

According to certain embodiments of the present disclosure, in a 5G radio network, a SAS is able to control bandwidth allocation to CBSDs at the beam level instead of only at the base station level. In other words, instead of simply modifying the overall allocation of bandwidth to a CBSD, a SAS is able to instruct a CBSD to modify the allocation of bandwidth for individual beams that have been established to support communications with the CBSD's UEs. In response, the CBSD is able to modify its existing beams and establish new beams to both comply with the SAS's instructions and attempt to meet the bandwidth needs of its UEs.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
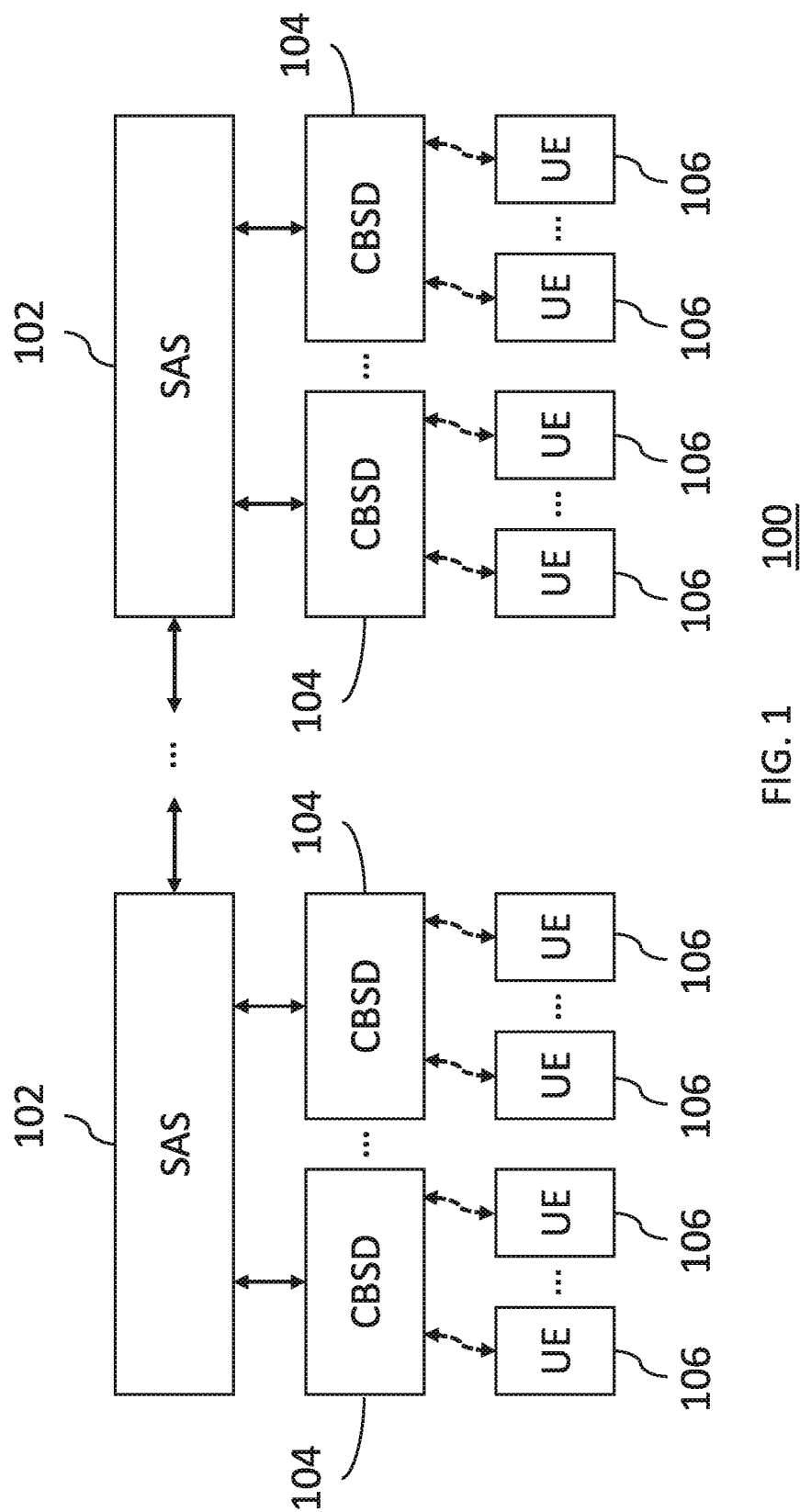
FIG. 1 is a block diagram showing a 5G CBRS radio system.

FIG. 1 is a block diagram showing a 5G CBRS radio system 100 having a plurality of SASs 102, each SAS 102 having one or more associated CBSDs 104, and each CBSD 104 having one or more associated UEs 106. Although logically depicted in FIG. 1 as being separated from one another, in the physical world, the coverage regions of different SASs 102 may overlap one another with overlapping coverage areas of CBSDs 104 of different SASs 102 and co-located or at least near-located UEs 106 of different SASs 102.

Figure 2:
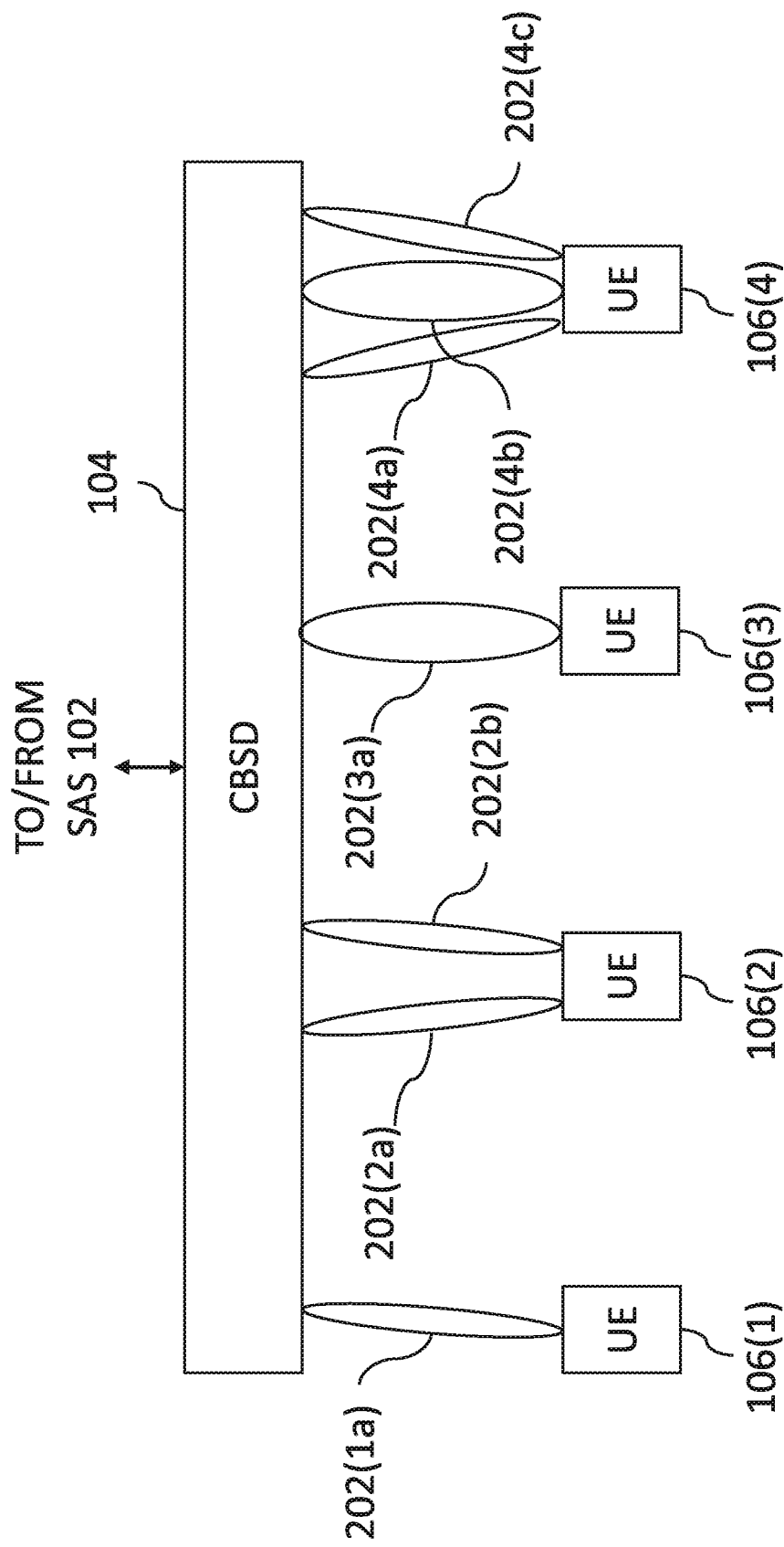
FIG. 2 is a block diagram of a simple example of a CBSD of FIG. 1 communicating with four different associated UEs.

FIG. 2 is a block diagram of a simple example of a CBSD 104 of FIG. 1 communicating with four different associated UEs 106(1)-106(4) via different sets of one or more DL beams 202, where the thicknesses of the DL beams in FIG. 2 represent qualitatively both the magnitudes of the bandwidths and the signal strengths of those beams. In particular, the CBSD 104 transmits DL signals (i) to the UE 106(1) via a single low-bandwidth, low-power DL beam 202(1a), (ii) to the UE 106(2) via two low-bandwidth, low-power DL beams 202(2a) and 202(2b), (iii) to the UE 106(3) via a single high-bandwidth, high-power DL beam 202(3a), and (iv) to the UE 106(4) via two low-bandwidth, low-power DL beams 202(4a) and 202(4c) and one high-bandwidth, high-power DL beam 202(4b). Those skilled in the art will understand that, in general, the CBSD 104 may transmit DL signals to a given UE 106 via any suitable number of beams having any suitable number of different bandwidth/power levels. Note that FIG. 2 does not show the UL beam representing UL communications from each UE 106 to the CBSD 104.

Figure 3:
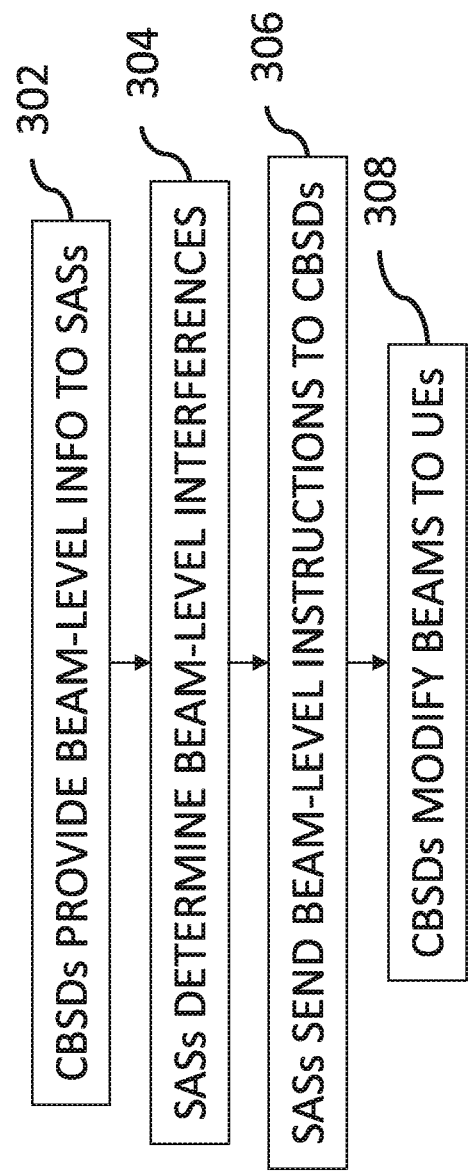
FIG. 3 is a flow diagram of processing performed by the SASs, CBSDs, and UEs of FIGS. 1 and 2, according to certain embodiments of the disclosure.

FIG. 3 is a flow diagram of processing performed by the SASs 102, CBSDs 104, and UEs 106 of FIGS. 1 and 2, according to certain embodiments of the disclosure.

In step 302, each CBSD 104 provides information to its associated SAS 102 that identifies the power level of each of its existing DL beams allocated to its associated UEs 106.

In step 304, the SASs 102 run propagation models to assess interference levels. One suitable propagation model is the COST Hata model. Depending on the particular implementation, each SAS 102 may individually assess interference levels between its own CBSDs 104 and UEs 106 or multiple SASs 102 may collectively assess interference levels between CBSDs 104 and UEs 106 associated with different SASs 102 as part of a CPAS operation or both. In any case, the result of these assessments is a determination of which specific DL beams are contributing unacceptable levels of interference and whether those DL beams should be terminated or at least powered lower. Note that, in a CBRS system that supports both Priority Access License (PAL) UEs and General Authorized Access (GAA) UEs, the bandwidths of PAL UEs will be protected before those of GAA UEs.

In step 306, the SASs 102 send beam-level instructions to the appropriate CBSDs 104 to power down (i.e., turn off or at least power lower) specific beams. In response, in step 308, those CBSDs 104 modify their DL beams to accommodate the instructions from the SASs 102.

Referring to both FIG. 2 and FIG. 3, in step 306, the associated SAS 102 may instruct the CBSD 104 to reduce the power level of DL beam 202(3a) used to communicate with UE 106(3). In that case, in step 308, the CBSD 104 could replace the single, high-bandwidth, high-power DL beam 202(3a) with a single low-bandwidth, low-power DL beam, such as that represented by beam 202(1a). Alternatively, in order to achieve both interference reduction and the UE's bandwidth needs, the CBSD 104 could replace the single, high-bandwidth, high-power beam 202(3a) with two low-bandwidth, low-power DL beams, such as those represented by beams 202(2a) and 202(2b).

Similarly, if the power level of the high-bandwidth, high-power DL beam 202(4b) used to communicate with the UE 106(4) along with the two low-bandwidth, low-power DL beams 202(4a) and 202(4c), the CBSD 104 could replace that high-power beam 202(4b) with one or more low-bandwidth, low-power DL beams while keeping the two beams 202(4a) and 202(4c).

Note that, in some implementations, the CBSDs 104 turn on newly added beams 202 for limited time durations in order to avoid creating additional interference. For a SAS to determine interference, the interference source should be continuous and constant. Turning on beams for a short time (e.g., typically less than 20 msec) will prevent interference detection.

Those skilled in the art will understand that there are many other initial and final configurations of beams that fall within the scope of the present disclosure, as long as the beam modifications made by each CBSD 104 comply with the instructions from the associated SAS 102, while still attempting to satisfy the bandwidth needs of its UEs 106. Note that, depending on the situation, the total bandwidth of the final configuration for a particular UE 106 could be less than, the same as, or even greater than the total bandwidth of the initial configuration.

Note that the steps of FIG. 3 are at least intermittently repeated such that the SASs will continue over time to monitor their networks for interference and instruct their CBSDs to modify their DL beams as needed to prevent or at least limit that interference.

Although the disclosure has been described in the context of SASs and CBSDs for 5G CBRS radio systems, those skilled in the art will understand that the disclosure can be implemented for radio systems other than 5G CBRS radio systems, in which case, (i) the SASs 102 would be replaced by analogous (5G or non-5G) processors that assess beam-level interference and (ii) the CBSDs 104 would be replaced by other types of (5G or non-5G) base stations.

In certain embodiments, the present disclosure is an article of manufacture comprising a processor for a radio system. The processor receives information from at least one base station about at least one beam used by the base station to communicate with a user equipment (UE); uses the information to assess interference associated with the at least one beam; and instructs the at least one base station to modify the at least one beam in order to reduce the interference associated with the beam.

In at least some of the above embodiments, the article further comprises the at least one base station.

In at least some of the above embodiments, the radio network is a 5G radio system.

In at least some of the above embodiments, the radio system is a 5G Citizens Broadband Radio System (CBRS) system; the processor is part of a Spectrum Access System (SAS); and the at least one base station is a CBRS base station (CBSD).

In at least some of the above embodiments, the SAS runs a propagation model to assess the interference.

In at least some of the above embodiments, the SAS runs the propagation model in coordination with one or more other SASs.

In certain embodiments, the present disclosure is a base station for a radio system, the base station configured to transmit information to a processor for the radio system about at least one beam used by the base station to communicate with a UE, wherein the processor uses the information to assess interference associated with the at least one beam; receive instructions from the processor to modify the at least one beam in order to reduce the interference associated with the beam; and modify the at least one beam to reduce the interference.

In at least some of the above embodiments, the radio network is a 5G radio system.

In at least some of the above embodiments, the radio system is a 5G CBRS system; the processor is part of a SAS; and the at least one base station is a CBSD.

In at least some of the above embodiments, the base station reduces the power level of the at least one beam.

In at least some of the above embodiments, the base station adds one or more lower-power beams for the UE.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A 5G Spectrum Access System (SAS) comprising a processor for a 5G radio system comprising a plurality of 5G base stations, each 5G base station configured to generate one or more downlink beams, wherein:
the processor receives beam-level information from one or more 5G base stations about one or more downlink beams used by the 5G base stations to communicate with one or more user equipments (UEs);
the processor uses the beam-level information to run a propagation model to assess beam-level interference associated with the one or more downlink beams; and
the processor generates and transmits beam-level instructions to instruct the at least one 5G base station to modify one or more of its downlink beams in order to reduce the beam-level interference associated with the one or more downlink beams, wherein, for at least one 5G base station having multiple downlink beams, the beam-level instructions instruct the 5G base station to reduce the power level of at least one of its downlink beams for a UE without reducing the power level of one or more of its other downlink beams, wherein the 5G SAS runs the propagation model in coordination with one or more other 5G SASs in order to reduce beam-level interference for at least one 5G base station of a 5G network associated with the 5G SAS, wherein the reduced beam-level interference is with respect to at least one 5G base station of a different 5G network associated with at least one other SAS.

2. The 5G SAS of claim 1, wherein:
the radio system is a 5G Citizens Broadband Radio System (CBRS) system; and
the one or more 5G base stations are CBRS base stations (CBSDs).

3. A method for a processor of a 5G SAS in a 5G radio system comprising a plurality of 5G base stations, each 5G base station configured to generate one or more downlink beams, the method comprising the processor:
receiving beam-level information from one or more 5G base stations about one or more downlink beams used by the one or more 5G base stations to communicate with one or more UEs;
using the beam-level information to run a propagation model to assess beam-level interference associated with the one or more downlink beams; and
generate and transmit beam-level instructions to instructing the at least one 5G base station to modify one or more of its downlink beams in order to reduce the beam-level interference associated with the one or more downlink beams, wherein, for at least one base station having multiple downlink beams, the beam-level instructions instruct the base station to reduce the power level of at least one of its downlink beams for a UE without reducing the power level of one or more of its other downlink beams, wherein the 5G SAS runs the propagation model in coordination with one or more other 5G SASs in order to reduce beam-level interference for at least one 5G base station of a 5G network associated with the 5G SAS, wherein the reduced beam-level interference is with respect to at least one 5G base station of a different 5G network associated with at least one other SAS.

4. The method of claim 3, wherein:
the radio system is a 5G CBRS system; and
the one or more 5G base stations are CBSDs.

5. The 5G SAS of claim 1, wherein the beam-level instructions instruct the at least one 5G base station to add one or more lower-power downlink beams for the UE.

6. The method of claim 3, wherein the beam-level instructions instruct the at least one 5G base station to add one or more lower-power downlink beams for the UE.

* * * * *